Dec. 3, 1935.  A. E. NORTHUP  2,023,238
VEHICLE BODY
Filed Oct. 13, 1933  2 Sheets-Sheet 1
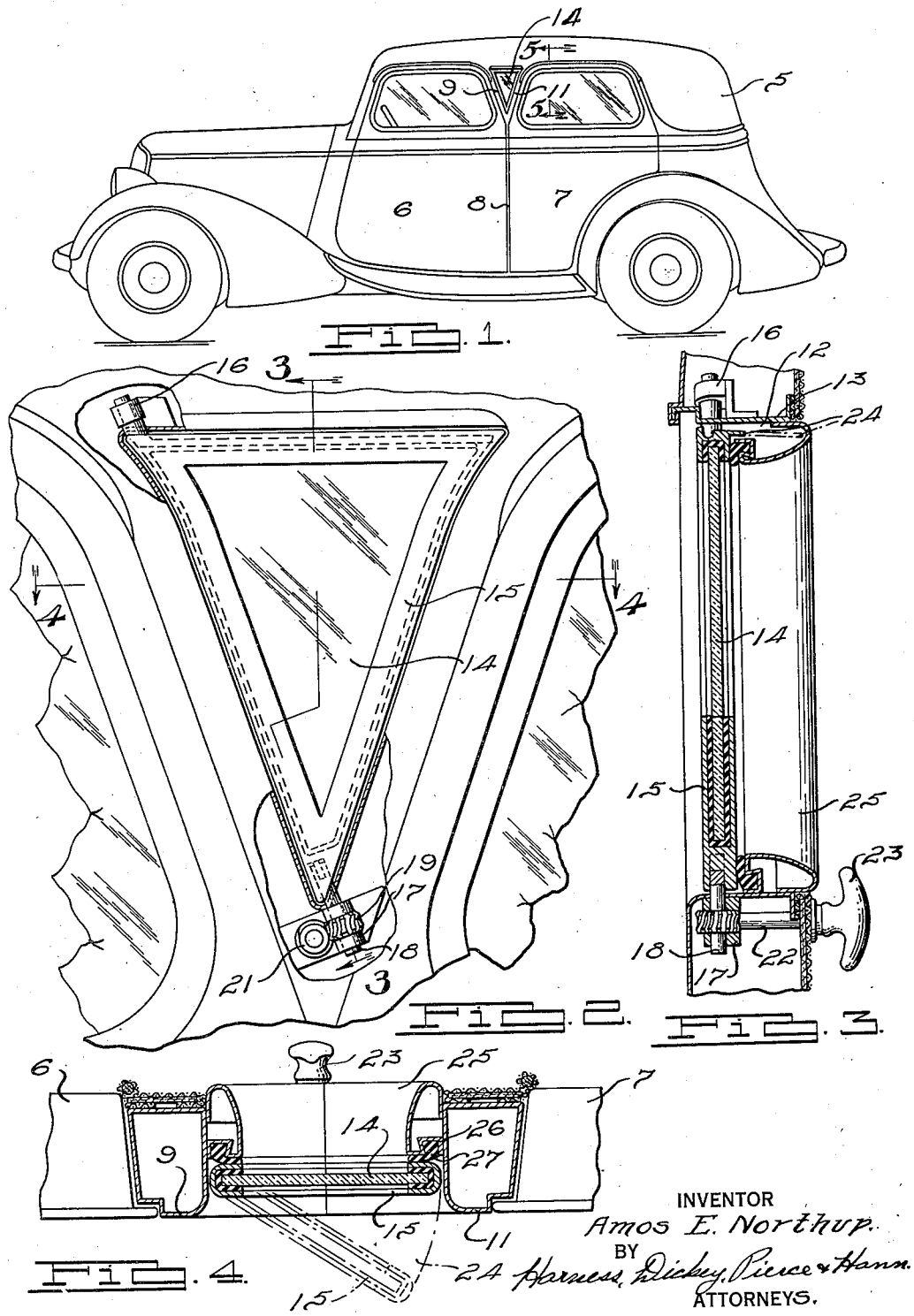
INVENTOR
Amos E. Northup.
BY
Harness, Dickey, Pierce & Hann
ATTORNEYS.

Dec. 3, 1935.  A. E. NORTHUP  2,023,238
VEHICLE BODY
Filed Oct. 13, 1933  2 Sheets-Sheet 2
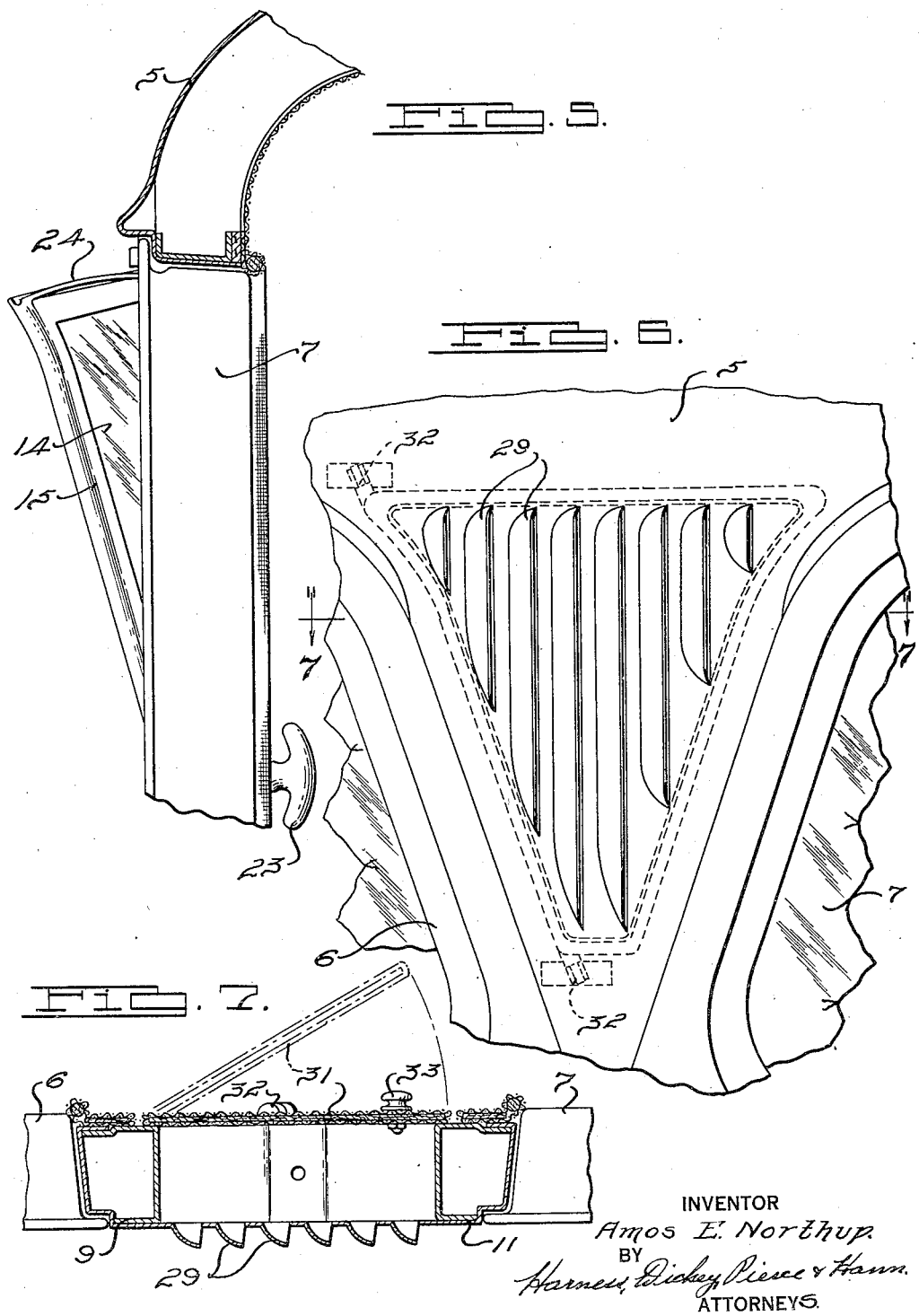
INVENTOR
Amos E. Northup
BY
Harness, Dickey, Pierce & Hann
ATTORNEYS Patented Dec. 3, 1935

2,023,238

UNITED STATES PATENT OFFICE 2,023,238

VEHICLE BODY

Amos E. Northup, Pleasant Ridge, Mich., assignor to The Murray Corporation of America, a corporation of Delaware Application October 13, 1933, Serial No. 693,407

7 Claims. (Cl. 296—44)

My invention relates to vehicle bodies and particularly to a vehicle body having an opening in the side thereof in which a window of the adjustable type is mounted for ventilating purposes.

Many types of windows have been employed on doors of vehicle bodies in an attempt to produce adequate ventilation and to eliminate draft on the vehicle occupants, particularly on the occupants of the rear compartment where an objectionable flow of air occurs around the back wall of the body. Changes in the arrangement of the door glass have been utilized to have a portion of the glass adjustable outwardly, or in such manner as to provide a suction draft effect in the presence of the air currents passing along the outsides of the vehicle.

I have materially increased the benefits derivable from such a ventilating system by employing the system midway of the vehicle between the front and rear door thereof. An adjustable panel is positioned to provide the right degree of suction for ventilating the vehicle and for eliminating air currents within the vehicle which were present when the windows in the doors were open.

In practicing my invention, I construct a window in the side of the body between the windows of the front and rear doors which is adjustable outwardly in the air stream along the side of the body which produces a suction of air from the inside of the body to provide ventilation therefor. The central door pillar is preferably bifurcated at the top, above the belt line, forming a triangular opening in which the window or panel is mounted on pivots for outward swinging movement. Suitable means are provided for adjusting and positioning the window on the top of which a drip trough and extension is provided which prevents any water from running off of the top of the vehicle into the interior of the body through the opening.

Accordingly, the main objects of my invention are to provide a ventilating system for drawing the air from the center of the interior of the vehicle; to provide an outwardly adjustable window or panel in the side of the body between the front and rear doors thereof projectable into the air stream along the side of the body to produce a suction flow of air from the interior of the vehicle; to provide an actuating mechanism for the window or panel which retains it in desired positions; to provide a drip trough and extension at the top edge of the window or panel to prevent any water from entering the opening when the panel is open; and, in general, to provide a closure for an opening formed by the bifurcated portion of a door pillar, which is substantially centrally disposed on the vehicle body, which materially adds to the appearance of the vehicle and which is provided with a drain trough and extension to prevent water from entering through the opening.

Other objects and features of novelty of my invention will be either specifically pointed out or will become apparent when referring, for a better understanding of my invention, to the following description taken in conjunction with the accompanying drawings, wherein:

Figure 1 is a side view, in elevation, of a vehicle embodying features of my invention, Fig. 2 is an enlarged broken sectional view of the structure illustrated in Fig. 1, taken on the line 2—2 thereof, Fig. 3 is a sectional view of the structure illustrated in Fig. 2, taken on the line 3—3 thereof, Fig. 4 is a sectional view of the structure illustrated in Fig. 2, taken on the line 4—4 thereof, Fig. 5 is an enlarged broken sectional view of the structure illustrated in Fig. 1, taken on the line 5—5 thereof, Fig. 6 is an enlarged broken sectional view of a structure similar to that illustrated in Fig. 2 showing a modified form of my invention, and Fig. 7 is a sectional view of the structure illustrated in Fig. 6, taken on the line 7—7 thereof.

In Fig. 1, I have illustrated a vehicle body 5 having a front door 6 and a rear door 7 disposed on either side of a central pillar 8. The central pillar 8 is bifurcated above the belt line of the door being divided into portions 9 and 11. The body paneling is cut away at this portion to form an opening between the bifurcated portion of the pillar between the doors. The opening 12, thus formed, has a jamb portion 13 at the top which may be the top rail extension provided longitudinally of the body.

In this opening, I have mounted a window 14 having a frame 15 thereabout, disposed to form a closure which is mounted on a pair of hinges 16 and 17, diagonally disposed relative to the vertical. While a vertically mounted window may be utilized, I have employed diagonally disposed hinges so that the opposite corner of the window will extend further outwardly from the vehicle body and will thereby provide more sensitive regulation to increase or decrease the suction effect from the body interior.

On the shaft 18, forming a portion of the hinge 17, I have mounted a worm wheel 19 which mates with a worm 21 which is connected by a shaft 22 to a handle 23 employed for actuating the window, or panel, which is retained in position by the engagement of the worm with the worm wheel. In this manner, the window may not only be easily adjusted to position but will also be retained in that position or in closed position, as the case may be, by the gear elements.

Referring to Figs. 3 and 4, I have illustrated a drain trough and extension 24 at the top edge of the frame 15 for the purpose of bridging the space between the frame 15 when open and the paneling of the vehicle. This prevents any water which may flow from the roof of the vehicle, from entering the opening into the interior of the body. The extension also prevents down current of air from flowing across the opening which would interfere with the suction action which is actually increased by the drain trough extension. As will be noted in Fig. 3, the trough extension is disposed diagonally downward from the frame 15 in view of the diagonally disposed hinges of the frame which causes the extension 24 to move angularly upwardly and slope outwardly from the body when the window is partially or entirely open.

In Figs. 3 and 4 are also illustrated the inner trim molding 25 in the nature of a complete frame section which fits inwardly to abut against sides of the opening 13 and to be retained thereby by screws or similar means (not shown). A reversely bent portion 26 on the inner marginal edge of the finish frame 25 retains a rubber molding 27 which is the shape of the frame 15 and against which the frame abuts to completely seal the opening 13 against the ingress of air or moisture when in closed position.

Fig. 5 illustrates more clearly the drain trough and extension 24 which bridges the window and body at the top of the window to prevent currents of air passing therebetween which would interrupt the outward suction of air and which also prevents any water from dripping from the roof into the interior of the vehicle through the opening 12. As pointed out above, the passage of air along the top of the extension 24 increases the suction effect through the opening 12 and is advantageous for this feature.

Referring to Figs. 6 and 7 I have illustrated a further extension of my novel ventilating means at the central portion of the vehicle wherein paneling extends between the legs 9 and 11 of the bifurcated pillar 8 which panels are preformed to provide the louvres 29 therein which are open toward the rear of the vehicle. The passage of air over the louvres, due to the movement of the vehicle, produces a suction effect which draws air from the interior of the body, the flow of which may be regulated by an inner closure element 31 which is pivoted flush with the inner trim of the body on the hinges 32. A knob 33 is mounted on the inner closure element 31, employed to effect its manipulation. Other arrangement of the panel and closure may be provided for the opening 12, as is well known to anyone skilled in the art. The particular novelty of my invention resides in the provision of the ventilating opening between the doors above the belt line of the body.

While I have illustrated a window of glass for closing the opening, it is to be understood that a hinged metal panel may be employed which may be painted and interfitted with the roof drip trough in such manner as to be substantially invisible from the exterior of the vehicle. Preferably, I employ the outer window but in certain cases I may desire to employ solid panels having louvres so as to substantially eliminate a hinged element on the exterior of the vehicle.

While I have described and illustrated but a single embodiment of my invention, it will be apparent to those skilled in the art that various changes, omissions, additions and substitutions may be made therein without departing from the spirit and scope of my invention, as set forth in the accompanying claims.

I claim as my invention:

1. An opening disposed in the side of a vehicle body in the fixed metal paneling thereof above the belt line and between the front and rear doors of the vehicle, a closure for said opening, and means for actuating said closure for outward movement.

2. An opening disposed in the side of a vehicle body in the paneling thereof above the belt line and between the front and rear doors of the vehicle, a closure for said opening, means for pivoting said closure on said paneling for outward movement, and means for actuating said closure to open and closed positions.

3. A pillar for a vehicle body between the front and rear door openings thereof which is bifurcated at the top portion above the belt line to form an opening for ventilating purposes.

4. A pillar for a vehicle body between the front and rear door openings thereof which is bifurcated at the top portion above the belt line to constitute an opening for ventilating purposes, and a closure for said opening.

5. A pillar for a vehicle body between the front and rear door openings thereof which is bifurcated at the top portion above the belt line to constitute an opening for ventilating purposes, a closure for said opening, and means for adjusting said closure to open and closed positions.

6. A pillar for a vehicle body between the front and rear door openings thereof which is bifurcated at the top portion above the belt line to constitute an opening to be employed for ventilating purposes, a closure for said opening, a drain trough and extension provided at the top of the closure for spanning the space between the closure and body at the top when the closure is open, and means for opening said closure.

7. A vehicle body having an opening between the front and rear doors, a window in said opening provided with a frame, pivots on said frame for supporting said window for opening and closing movement, means for actuating said window to open and closed positions, and a drain trough and extension rigidly carried by the closure for sealing the top space between the closure and body when in open position.

AMOS E. NORTHUP.